(12) United States Patent
Sekiya (10) Patent No.: US 10,358,217 B2
(45) Date of Patent: Jul. 23, 2019

(54) HUMAN TRANSPORTING DRONE

(71) Applicant: DISCO CORPORATION, Tokyo (JP)

(72) Inventor: Kazuma Sekiya, Tokyo (JP)

(73) Assignee: Disco Corporation, Tokyo (JP)

( * ) Notice: Subject to any disclaimer, the term of this patent is extended or adjusted under 35 U.S.C. 154(b) by 280 days.

(21) Appl. No.: 15/370,302

(22) Filed: Dec. 6, 2016

(65) Prior Publication Data

US 2017/0166309 A1 Jun. 15, 2017

(30) Foreign Application Priority Data

Dec. 11, 2015 (JP) .................................. 2012-241758

(51) Int. Cl.
| | |
|---|---|
| *B64C 39/02* | (2006.01) |
| *B64D 11/00* | (2006.01) |
| *B64D 11/06* | (2006.01) |
| *B64D 1/22* | (2006.01) |
| *B64D 17/00* | (2006.01) |
| *B64D 25/00* | (2006.01) |

(52) U.S. Cl.
CPC ............ *B64D 11/00* (2013.01); *B64C 39/024* (2013.01); *B64C 39/026* (2013.01); *B64D 1/22* (2013.01); *B64D 11/062* (2014.12); *B64D 17/00* (2013.01); *B64D 25/00* (2013.01); *B64C 2201/027* (2013.01); *B64C 2201/12* (2013.01); *B64C 2201/141* (2013.01); *B64C 2201/146* (2013.01); *B64C 2201/185* (2013.01)

(58) Field of Classification Search
CPC ............ B64C 39/026; B64C 2201/027; B64C 2201/128; B64C 2201/141; B64C 2201/185; B64D 1/22

See application file for complete search history.

(56) References Cited

U.S. PATENT DOCUMENTS

| | | | | |
|---|---|---|---|---|
| 9,174,733 | B1* | 11/2015 | Burgess | B64D 1/12 |
| 9,302,770 | B2* | 4/2016 | Burgess | B64D 1/12 |
| 9,321,531 | B1* | 4/2016 | Takayama | B64D 1/12 |
| 9,346,547 | B2* | 5/2016 | Patrick | B64C 39/024 |
| 9,493,238 | B2* | 11/2016 | Takayama | B64D 1/12 |
| 9,567,081 | B1* | 2/2017 | Beckman | B64D 1/12 |
| 9,580,173 | B1* | 2/2017 | Burgess | B64C 39/024 |
| 9,630,715 | B2* | 4/2017 | Takayama | B64D 1/12 |
| 9,783,295 | B2* | 10/2017 | Takayama | B64D 1/12 |
| 9,783,297 | B2* | 10/2017 | Patrick | B64C 39/024 |
| 9,849,981 | B1* | 12/2017 | Burgess | B64D 1/12 |
| 9,896,182 | B1* | 2/2018 | Beckman | B64D 1/12 |
| 9,944,366 | B2* | 4/2018 | Tang | B63C 9/01 |
| 9,957,046 | B2* | 5/2018 | Patrick | B64C 39/024 |
| 9,981,834 | B2* | 5/2018 | Bialkowski | B64C 39/024 |
| 10,000,285 | B2* | 6/2018 | Shannon | B64D 1/02 |

(Continued)

FOREIGN PATENT DOCUMENTS

JP 2015-207149 11/2015

*Primary Examiner* — Philip J Bonzell (74) *Attorney, Agent, or Firm* — Greer Burns & Crain, Ltd.

(57) ABSTRACT

Disclosed herein is a human transporting drone including a drone core, a human receptacle for accommodating a human, the human receptacle being detachably housed in the drone core, ropes connected to the human receptacle, and rope winding mechanisms mounted on the drone core, for winding the ropes to house the human receptacle into the drone core and unwinding the ropes to release the human receptacle from the drone core.

4 Claims, 6 Drawing Sheets

(56) References Cited

U.S. PATENT DOCUMENTS

| | | | |
|---|---|---|---|
| 10,106,257 B2 * | 10/2018 | Patrick | B64C 39/024 |
| 2011/0267241 A1 * | 11/2011 | Grimm | B64B 1/02 |
| | | | 343/706 |
| 2017/0267345 A1 * | 9/2017 | Marom | B64C 39/02 |
| 2018/0072418 A1 * | 3/2018 | Shannon | B64C 39/024 |
| 2018/0072419 A1 * | 3/2018 | Burgess | B64D 1/12 |
| 2018/0072420 A1 * | 3/2018 | Prager | B64C 39/024 |

* cited by examiner

HUMAN TRANSPORTING DRONE

BACKGROUND OF THE INVENTION

Field of the Invention

The present invention relates to a human transporting drone for rescuing a human life, which can be flied under remote control, automatic control, etc.

Description of the Related Art

In recent years, attention has been drawn to unmanned aerial vehicles, or drones, which can be flied under remote control or flied under automatic control to a position memorized by a controller mounted thereon. Since the drone has structural features that allow itself to be controlled easily for stable flight, it has been recognized as a suitable tool for taking aerial photographs of dangerous spots or environments which are inaccessible by a helicopter, e.g., volcanic craters, large herds of animals, etc.

Various efforts have been made to develop applications of drones, including the delivery of cargos to individual destinations. There has been proposed a surveillance system for tracking and monitoring an object with a drone that can be moved three-dimensionally (see, for example, Japanese Patent Laid-Open No. 2015-207149).

SUMMARY OF THE INVENTION

However, no full review has been carried out to use drones for rescuing people stranded in dangerous places.

It is therefore an object of the present invention to provide a drone for rescuing a person stranded in a dangerous place which cannot easily be accessed by a helicopter or the like and from which it is difficult to rescue people.

In accordance with an aspect of the present invention, there is provided a human transporting drone including a drone core, a human receptacle for accommodating a human, the human receptacle being detachably housed in the drone core, ropes connected to the human receptacle, and rope winding means mounted on the drone core, for winding up the ropes to house the human receptacle into the drone core and unwinding the ropes to release the human receptacle from the drone core.

Preferably, while the drone core is hovering, the ropes are unwind to lower the human receptacle to allow a human to enter and leave the human receptacle, and after a human have entered and left the human receptacle, the ropes are wound to combine the human receptacle with the drone core.

Preferably, the human receptacle has an emergency escape function. The emergency escape function is performed by release means for releasing the human receptacle from the drone core and a parachute connected to the human receptacle, the parachute being openable after the human receptacle has been released from the drone core.

The human transporting drone according to the present invention is able to rescue a person stranded in a dangerous place or a person stranded in a place from which it is difficult to rescue people with a helicopter.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
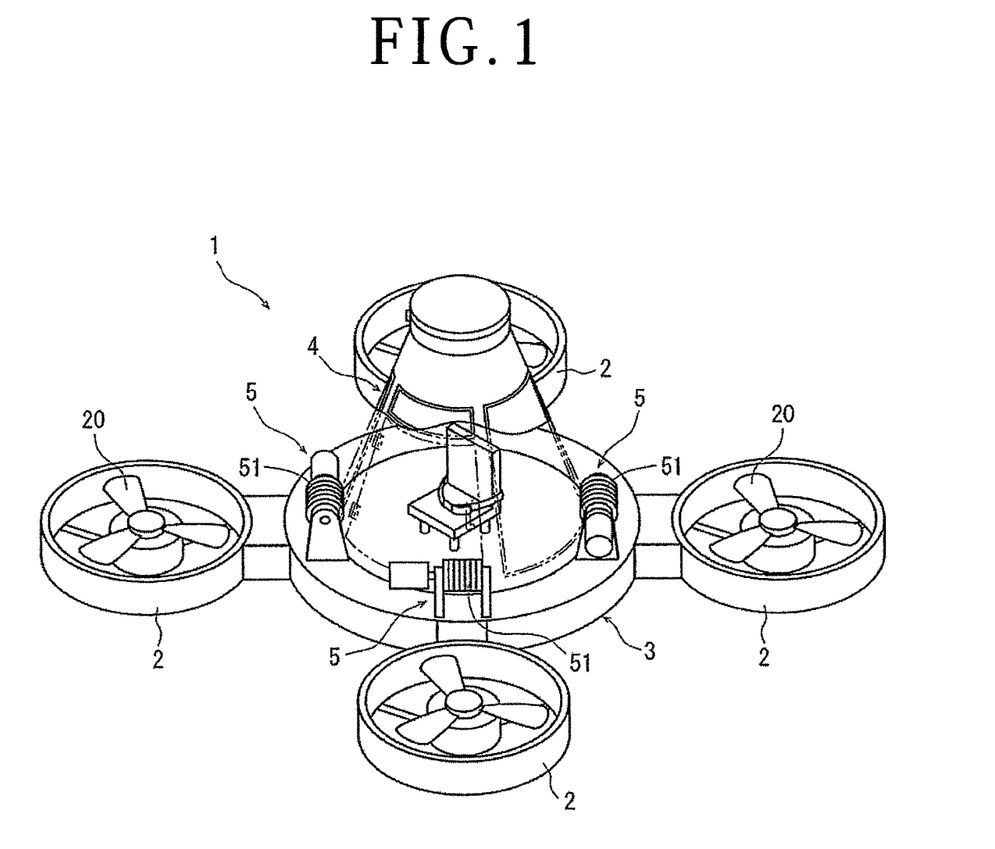
FIG. 1 is a perspective view of a human transporting drone according to an embodiment of the present invention.

A human transporting drone according to a preferred embodiment of the present invention will be described below with reference to the accompanying drawings. As shown in FIG. 1, the human transporting drone, generally denoted by the reference numeral 1, includes a circular drone core or drone body 3 with four main rotors 2 disposed on its outer periphery and a human receptacle 4 stored in the circular drone core 3.

Each of the main rotors 2 includes a plurality of blades 20 rotatable by an electric motor for producing a vertically upward aerodynamic lift. The blades 20 of adjacent twos of the main rotors 2 rotate in opposite directions for ensuring drone stability. The four main rotors 2 have their rotational speeds individually controlled by an arithmetic processing unit (not shown) housed in the drone core 3. The rotational speeds of the respective main rotors 2 are controlled for enabling the human transporting drone 1 to ascend, descend, move leftwards, rightwards, forwards, and rearwards, and hover freely.

The arithmetic processing unit is supplied with detected signals from various sensors housed in the drone core 3. The sensors include a gyro sensor for detecting attitude changes, an acceleration sensor for detecting a moving direction and a moving acceleration, an atmospheric pressure sensor for calculating altitude changes and altitude positions, a magnetic sensor for detecting an azimuth, an ultrasonic sensor for monitoring distances from objects in the periphery, and a global positioning system (GPS) sensor for detecting signals from satellites to identify a current position, etc.

Cameras for capturing images of the external field are mounted in a plurality of locations on lower and upper surfaces of the drone core 3. The cameras are used when the human transporting drone 1 is operated under remote control. When the human transporting drone 1 is automatically operated on its own, the cameras can capture images of objects in the periphery, and the images of shapes and colors of the objects in the periphery are processed to produce positional information, etc. Depending on attitude changes of the human transporting drone 1, the rotational speeds of the main rotors 2 are controlled to reach target values. Depending on detected values from the various sensors, the rotational speeds of the main rotors 2 are corrected to achieve flight stability against disturbances caused by winds, etc. and attitude changes of a rescuee in the human receptacle 4 as described later.

The drone core 3 houses therein a battery, not shown, for supplying electric power to the electric motors for actuating the main rotors 2. In view of a weight balance, the battery is divided into four battery sections that are spaced at circumferentially uniform intervals in the drone core 3. On the upper surface of the drone core 3, there are disposed four rope winding means 5, or winch mechanisms, for lowering and lifting the human receptacle 4. The rope winding means 5 are capable of lowering and lifting the human receptacle 4 while keeping it horizontal according to an instruction signal from the arithmetic processing unit. Although not shown, landing means for absorbing shocks applied when the human transporting drone 1 is landed is mounted on the lower surface of the drone core 3.

Figure 2:
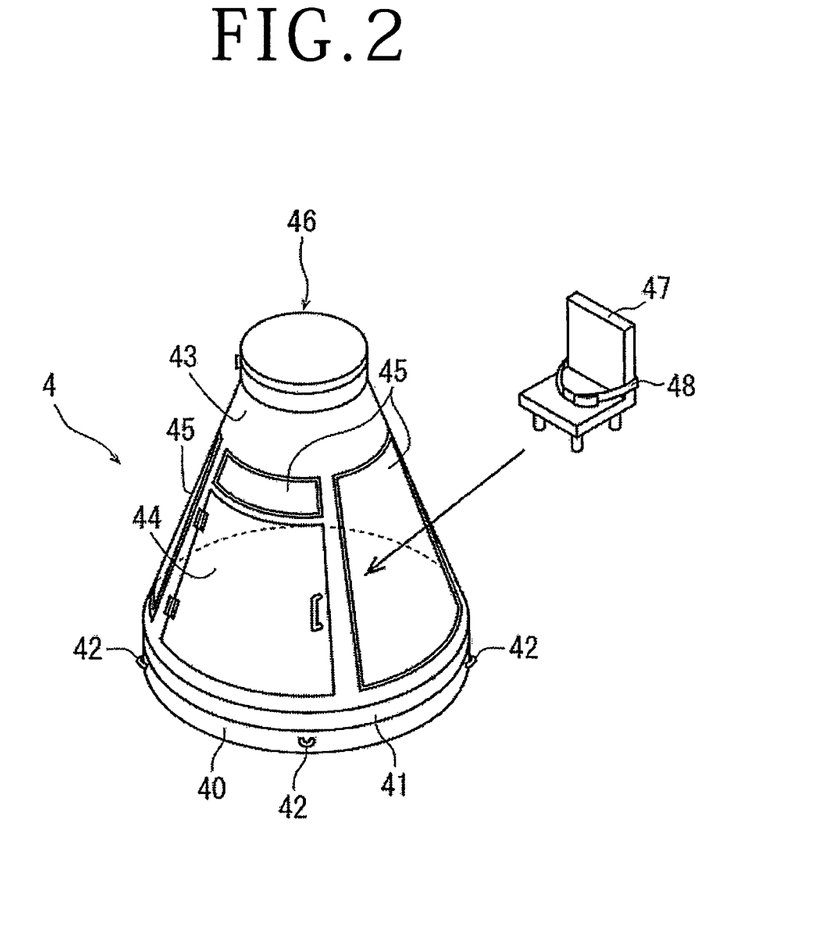
FIG. 2 is a perspective view of a human receptacle disposed in the human transporting drone shown in FIG. 1.

As shown in FIG. 2, the human receptacle 4 creates a closed space over a base 40 with a floor 41 interposed therebetween, and the base 40 has four fixtures 42 disposed at circumferentially spaced locations on its outer surface. Wire ropes 51 (see FIG. 1) extending from the rope winding means 5 can be detachably secured to the respective fixtures 42. The human receptacle 4 includes a substantially conical receptacle cover 43 disposed on the floor 41 and having a hatch 44 through which a rescuee can pass into and out of the human receptacle 4 and a plurality of windows 45 that provide visibility into and out of the human receptacle 4. The human receptacle 4 also has a parachute housing 46 on its upper end which can be opened by an external action or an internal switch disposed in the human receptacle 4. The receptacle cover 43 houses therein a seat 47 disposed on the floor 41 for a rescuee to be seated thereon and a seat belt 48 attached to the seat 47 for being fastened by the rescuee seated on the seat 47. The receptacle cover 43 may be made of a transparent acrylic panel so that the rescuee in the human receptacle 4 can look around in all directions.

Operation of the human transporting drone 1 will be described in detail below. First, when it is discovered that a rescuee is stranded in a dangerous place from which it is difficult to rescue people, the human transporting drone 1 according to the present embodiment is dispatched toward the place. In principle, the human transporting drone 1 is operated under remote control to fly toward the rescue place where the rescuee is considered to be, which is set as a target position, while confirming, with the GPS sensor, the positional relationship between the present position of the human transporting drone 1 and the target position. The human transporting drone 1 flies toward the rescue place while confirming the periphery with the cameras on the drone core 3.

When the human transporting drone 1 approaches the site where the rescuee is, the human transporting drone 1 is moved to a position where it can lower and land the human receptacle 4 while observing the images captured by the cameras and the height from the spot where the rescuee is as detected by the ultrasonic sensor, etc. Then, while the human transporting drone 1 is hovering at the position, the rope winding means 5 are actuated to lower the human receptacle 4, as shown in FIG. 3.

After the human receptacle 4 has been lowered and landed at the rescue position, the rescuee opens the hatch 44 of the human receptacle 4 and enters the human receptacle 4. At this time, the remote control operator who operates the human transporting drone 1 at a remote location can talk to the rescuee via a radio unit disposed in the human receptacle 4, and can give the rescuee instructions about how to operate the hatch 44 and how to escape after having entered the human receptacle 4, and can also confirm the status of the rescuee.

Figure 3:
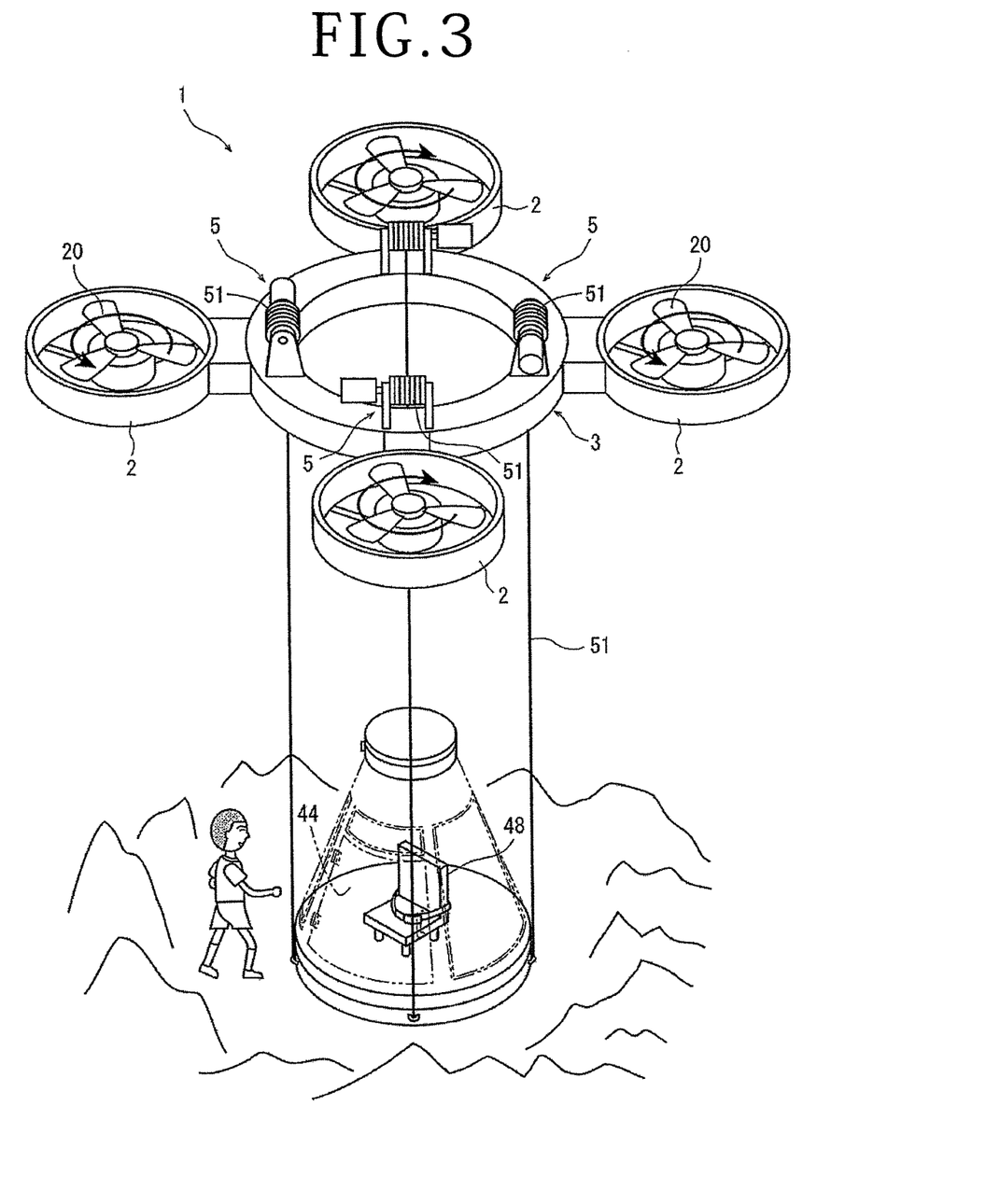
FIG. 3 is a perspective view illustrating the manner in which the human receptacle is lowered from the human transporting drone shown in FIG. 1.
Figure 4:
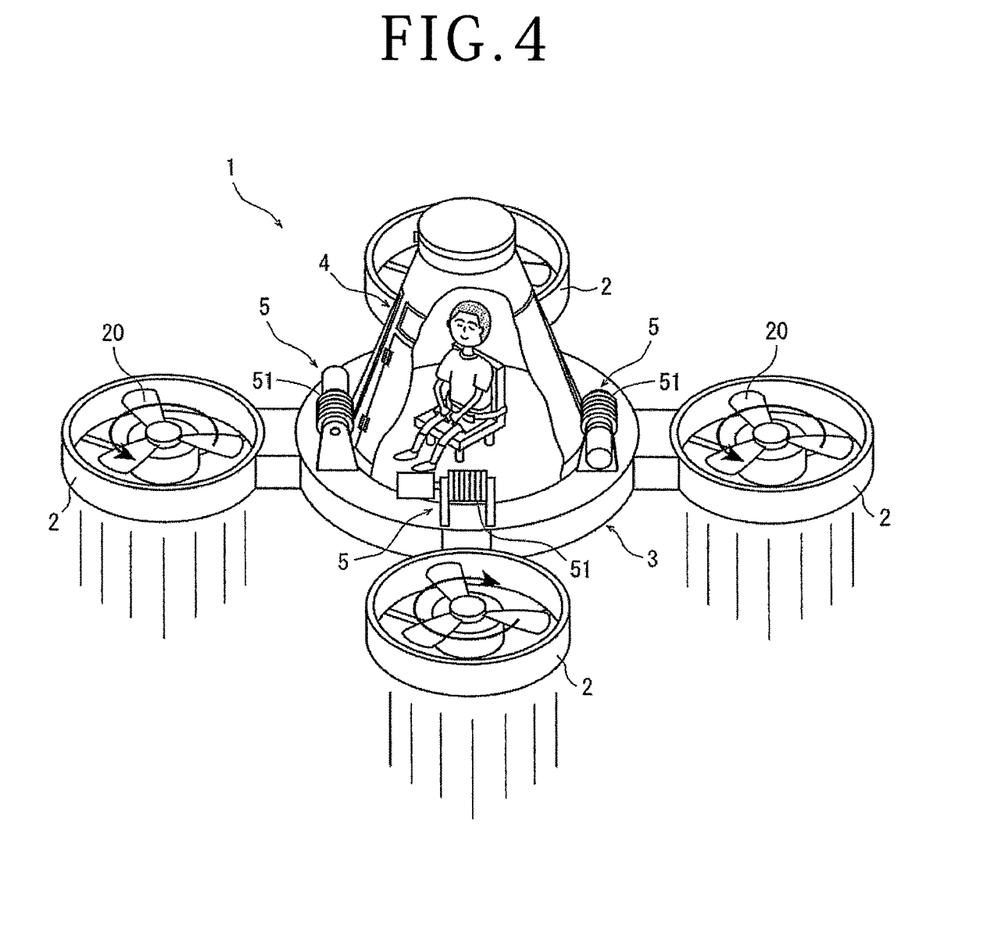
FIG. 4 is a perspective view illustrating the manner in which a rescuee who has come on board the human transporting drone is taking an evacuation flight.

When it is confirmed by the remote control operator that the rescuee has entered the human receptacle 4, been seated on the seat 47, fastened the seat belt 48, and completed the evacuation, the rope winding means 5 are actuated to wind the wire ropes 51 to lift the human receptacle 4 from the position shown in FIG. 3 to the human transporting drone 1 as it is hovering as shown in FIG. 4. When the human receptacle 4 has been accommodated in the drone core 3, the human transporting drone 1 with the rescuee is operated under remote control to fly to and be landed at a nearby safe place. Now, the mission to rescue the rescuee from the dangerous place is completed. The nearby safe place may not necessarily be the location from which the human transporting drone 1 has departed, but may be a safe place which is as close to the site from which the rescuee has been rescued as possible.

According to the present embodiment, the human transporting drone 1 is provided with an emergency escape function which is to be performed when the human transporting drone 1 has picked up the rescuee and been returning if the human transporting drone 1 suffers a trouble which is judged as making subsequent continued flight difficult, such as when the attitude control becomes unstable or the battery for supplying electric power to the electric motors for actuating the main rotors 2 suffers a shortage of available stored electric power, or a serious mechanical trouble, or if it is judged that such a trouble will obviously happen to the human transporting drone 1 in the extremely near future. The emergency escape function will be described below. Any trouble which makes subsequent continued flight difficult is judged on the basis of the degree of stability of the flight attitude detected by the gyro sensor, the acceleration sensor, etc. connected to the arithmetic processing unit on the drone core 3, the states (rotational speeds, temperatures, etc.) of the electric motors for actuating the main rotors 2, a remaining stored electric power signal from the battery, or various failure signals from the various devices on the human transporting drone 1.

The emergency escape function is performed by emergency escape means which includes plural release means for releasing the human receptacle 4 from the drone core 3. Depending on the situation which is being experienced by the human transporting drone 1, one of the release means is selected and put into action.

Figure 5:
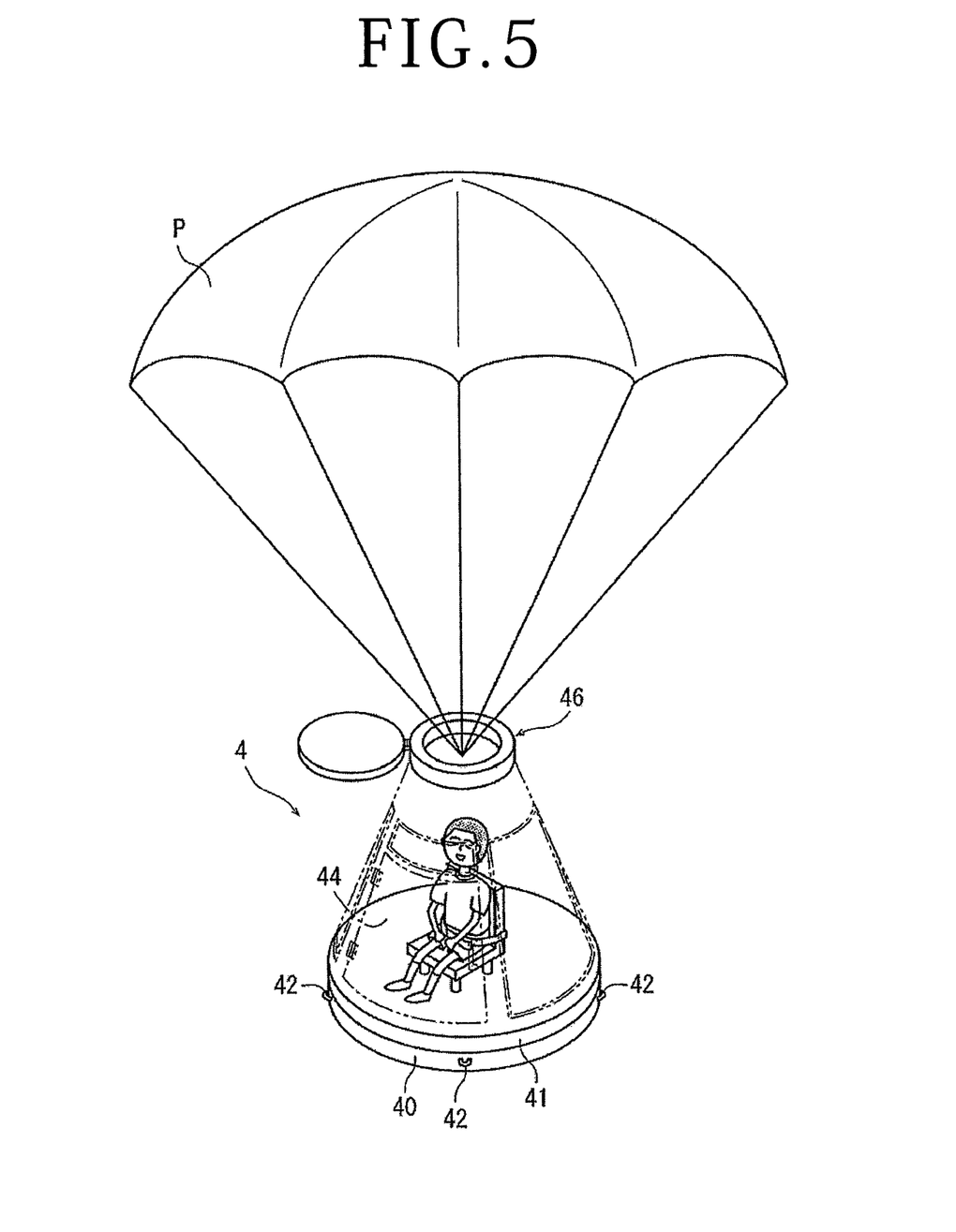
FIG. 5 is a perspective view illustrating the manner in which the human receptacle with the rescuee is being dropped by parachute after being released from a drone core of the human transporting drone.

One of the release means is as follows: If it is judged that it is difficult to continue the flight of the human transporting drone 1 and the human transporting drone 1 is in a position where the flight altitude is sufficiently high, then in order to separate the human receptacle 4 from the human transporting drone 1, the rope winding means 5 are actuated to unwind the wire ropes 51 from the drone core 3, lowering the human receptacle 4. When the human receptacle 4 is spaced from the drone core 3 as indicated by their positional relationship in FIG. 3, the wire ropes 51 are simultaneously severed from the four fixtures 42, completely disconnecting the human receptacle 4 from the drone core 3. At this time, the wire ropes 51 may not be severed from the fixtures 42, but the four fixtures 42 may be simultaneously released from the base 40. In coordination with these actions, a parachute is released upwardly under the pressure of a compressed gas or the like from the parachute housing 46 on the upper end of the human receptacle 4. At the same time that the human receptacle 4 is separated from the drone core 3, the parachute is quickly spread, reducing the speed of descent of the human receptacle 4 to minimize the shock applied when the human receptacle 4 is landed (see FIG. 5). The "position where the flight altitude is sufficiently high" described above refers to an altitude from which the parachute that has been opened makes the speed of descent sufficiently lower until the human receptacle 4 is landed.

Another release means is as follows: If it is judged that it is difficult to continue the flight of the human transporting drone 1 and the human transporting drone 1 is not in a position where the flight altitude is sufficiently high, i.e., if it is judged that it is difficult to land the human receptacle 4 safely because of a lack of sufficient altitude when the parachute is released and the human receptacle 4 is separated, then the human transporting drone 1 is maintained aerial and its altitude is lowered, and the rope winding means 5 are actuated to unwind the wire ropes 51 from the drone core 3, lowering the human receptacle 4 until it is landed. Then, the wire ropes 51 are severed from the four fixtures 42, disconnecting the human receptacle 4 from the drone core 3. At this time, the wire ropes 51 may not be severed from the fixtures 42, but the four fixtures 42 may be simultaneously released from the base 40.

Still another release means is as follows: If it is judged that it is difficult to continue the flight of the human transporting drone 1 and a power supply system for the rope winding means 5 suffers a trouble, then providing the altitude of the human transporting drone 1 is such that the human receptacle 4 can be released using the parachute, the human receptacle 4 is released upwardly from the drone core 3 as shown in FIG. 6.

Figure 6:
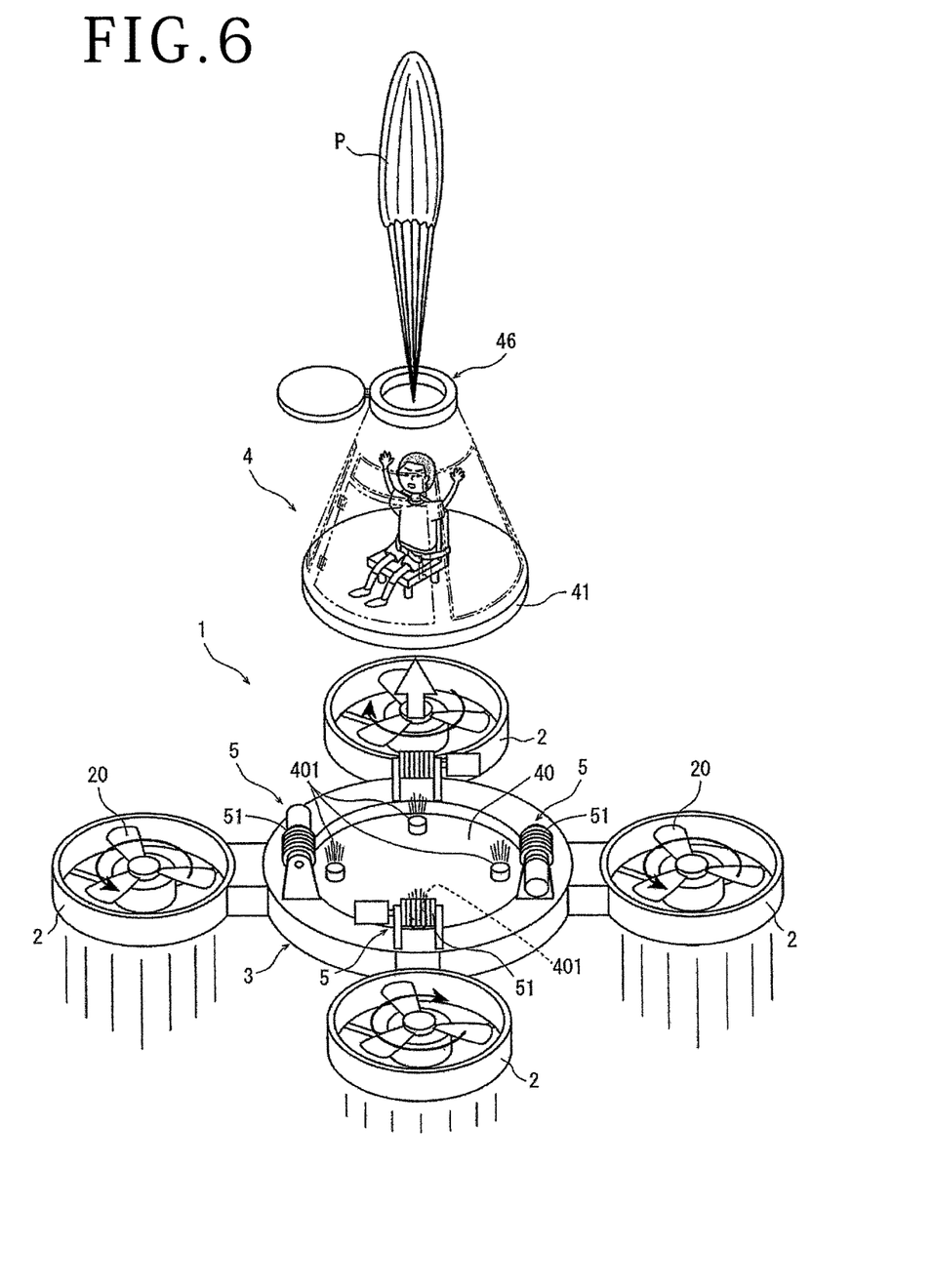
FIG. 6 is a perspective view illustrating the manner in which the human receptacle with the rescuee is being released upwardly from the drone core.

As shown in FIG. 6, while the base 40 remains secured to the drone core 3 and hence cannot be lowered from the drone core 3, the human receptacle 4 is released upwardly from the drone core 3. More specifically, a joint between the base 40 and the floor 41 as a lower portion of the human receptacle 4 includes four compressed gas containers 401. The compressed gas containers 401 are actuated to discharge a compressed gas to eject the human receptacle 4 upwardly from the base 40. The compressed gas containers 401 can be actuated by a small power supply that can be provided in the human receptacle 4, rather than a large power supply. When the compressed gas containers 401 are actuated, the parachute is released in coaction from the parachute housing 46. Therefore, simultaneously when the human receptacle 4 is released upwardly from the drone core 3, the parachute is released upwardly under the pressure of the compressed gas or the like from the parachute housing 46, and is quickly spread, reducing the speed of descent of the human receptacle 4 to minimize the shock applied when the human receptacle 4 is landed.

In the illustrated embodiment, the human transporting drone 1 has the four main rotors 2. However, the present invention is not limited to such an arrangement. The human transporting drone according to the present invention may have six, eight, or more main rotors. If the human transporting drone has six or more main rotors, then even in the event of a failure of one of the main rotors, the other main rotors may be correctively controlled in operation to enable the human transporting drone to continue safe flight.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A human transporting drone comprising:
    a drone core having a top side and a bottom side, and a central opening extending from said top side to said bottom side;
    a plurality of rotors attached to said drone core;
    a human receptacle for accommodating a human, said human receptacle being configured to be detachably housed in said opening in said drone core;
    ropes connected to said human receptacle; and
    rope winding means mounted on said drone core for winding said ropes to house draw said human receptacle into said opening in said drone core from through the bottom side so that said human receptacle protrudes from said top side of the said drone core when said human receptacle is housed in said opening, and unwinding said ropes to release said human receptacle from said opening of said drone core through said bottom side of said drone core.

2. The human transporting drone according to claim 1, wherein while said drone core is hovering, said ropes are unwound to lower said human receptacle to allow a human to enter and leave said human receptacle, and after a human has entered and left said human receptacle, said ropes are wound to combine said human receptacle with said drone core.

3. The human transporting drone according to claim 1, wherein said human receptacle has an emergency escape function which is performed by release means for releasing said human receptacle from said drone core and a parachute connected to said human receptacle, said parachute being openable after said human receptacle has been released from said drone core.

4. The human transporting drone according to claim 1, wherein said central opening in the drone core is circular.

* * * * *

UNITED STATES PATENT AND TRADEMARK OFFICE
CERTIFICATE OF CORRECTION

PATENT NO. : 10,358,217 B2
APPLICATION NO. : 15/370302
DATED : July 23, 2019
INVENTOR(S) : Kazuma Sekiya Page 1 of 1

It is certified that error appears in the above-identified patent and that said Letters Patent is hereby corrected as shown below:

On the Title Page

Under item "(30) Foreign Application Priority Data," delete "2012-241758" and insert --2015-241758-- therefor.

In the Claims

Column 6, Line 23, delete "house".

Signed and Sealed this
Seventeenth Day of September, 2019

Andrei Iancu
*Director of the United States Patent and Trademark Office*